Figures 1, 2:
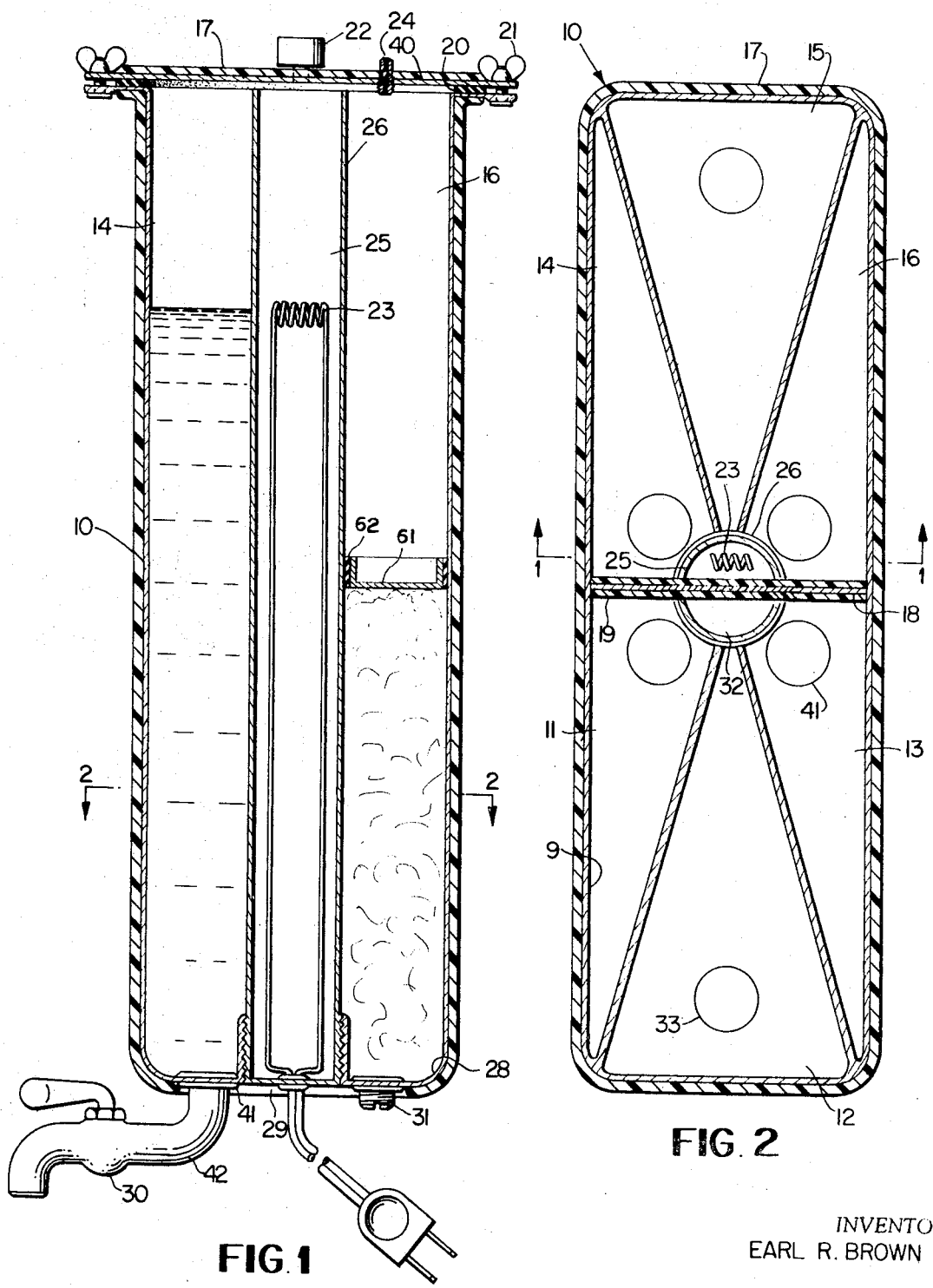

United States Patent

[11] 3,593,888

[72] Inventor Earl R. Brown
 717 Court St., Utica, N.Y. 13502
[21] Appl. No. 837,444
[22] Filed June 30, 1969
[45] Patented July 20, 1971

[54] PORTABLE FOOD DISPENSER
 11 Claims, 5 Drawing Figs.
[52] U.S. Cl. ............................................. 222/146,
 222/132, 222/249, 222/389
[51] Int. Cl. ........................................................ B67d 5/62
[50] Field of Search ...................................... 222/146,
 132, 152, 249, 491, 389; 221/132

[56] References Cited
 UNITED STATES PATENTS
3,208,643 9/1965 Phillips ........................ 222/176
3,367,545 2/1968 Cook ............................ 222/389
1,979,323 11/1934 Felesina et al. ............... 222/146 C X
2,701,079 2/1955 Buchler ........................ 222/152
2,868,416 1/1959 Smith ........................... 222/146 HE
3,216,627 11/1965 Best et al. ..................... 222/249
3,270,918 9/1966 Goodrich et al. ............. 222/146 HE X
3,353,717 11/1967 Edwards ....................... 222/132
3,391,830 7/1968 Kitchens ....................... 222/132
3,435,990 4/1969 Pike, Jr. ........................ 222/146 X Primary Examiner—M. Henson Wood, Jr.
Assistant Examiner—Thomas C. Culp, Jr.
Attorney—Laurence R. Brown ABSTRACT: A portable food dispenser is disclosed with one or more compartments which can hold different foods or beverages about a common temperature regulating section. The products are dispensed by internal pressure through a valve in each compartment and the pressure may be produced from a steam hose or the use of a cylinder of sterile, inert gas.

INVENTOR
EARL R. BROWN

INVENTOR
EARL R. BROWN

BY Lawrence R. Brown
ATTORNEY

PORTABLE FOOD DISPENSER

This invention relates to food dispensers and more specifically it relates to insulated containers for dispensing foodstuffs by means of internal pressure.

Many environments exist where a dispenser of hot and cold foodstuffs of various sorts is desirable. Feeding armed services in the field, is one example, or providing meals at a picnic or ballpark, where portability is desired. Also in many restaurants, etc., it is desirable to close down kitchen facilities during off peak hours and to minimize the staff on duty. Thus, it is desirable to have means for storing and dispensing hot foods efficiently.

The prior art has not provided adequate simple equipment for dispensing multiple product hot or cold foodstuffs on site. Various pressurized containers are available for discharging food items such as cheese and whip cream, but these are expensive, not subject to reuse and are not generally capable of sorting hot or cold foods in a desired temperature range for relatively long periods of time.

Problems also exist in meeting sanitary requirements when dispensing foodstuffs. This has led to limited use of portable dispenser or food storage containers which temporarily hold foodstuffs in condition for immediate serving.

It is therefore an objective of this invention to provide improved food dispensing means solving the foregoing problems.

A further object of the invention is to provide a dispenser means for storing and serving a multiplicity of foodstuffs at a predetermined temperature.

In accordance with the invention therefore there is provided a foodstuff dispensing device having an insulated container divided into one or more compartments for holding different foodstuffs. Means such as a heater or cooler is provided for keeping the temperature within a desired range. Thus, a special compartment may contain a heater element which commonly heats all compartments. In order to dispense different sorts of foodstuffs from the individual compartments internal pressurization may be provided within the container to force foodstuffs out a port in each compartment supplied with an appropriate selective valve mechanism. The pressurization may be supplied by means of generating steam, for example.

Figure 5:
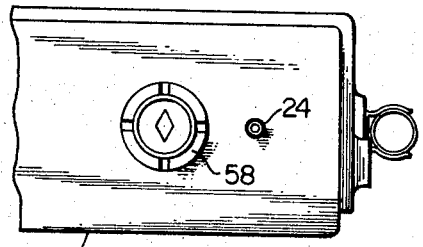
Figure 4:
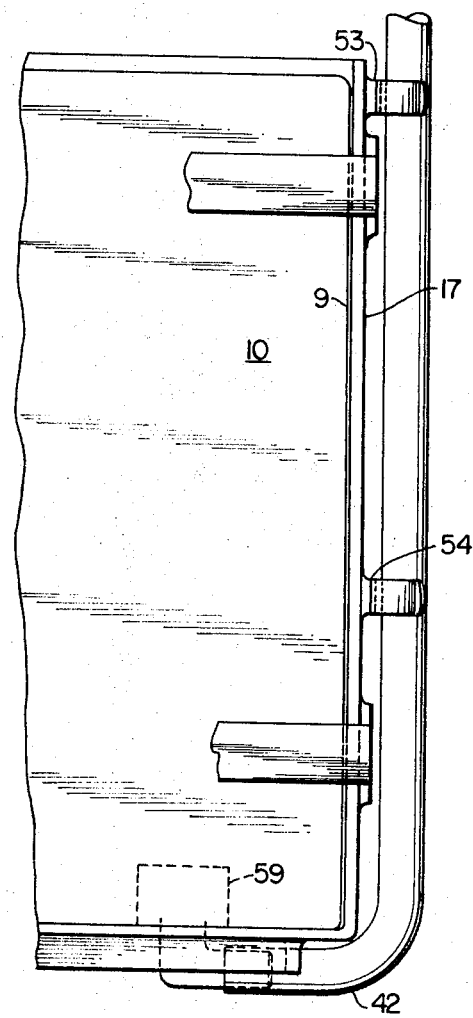
Figure 3:
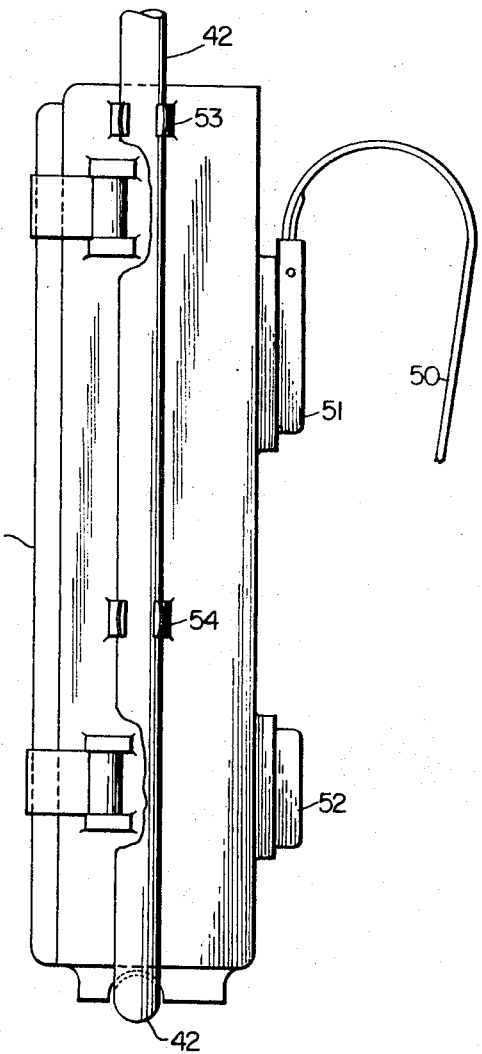

These and further features, objects and advantages of the invention will be described in connection with embodiments of the invention set forth in the following description referring to the accompanying drawing, wherein:

FIG. 1 is an elevation view in section of a food dispensing container constructed in accordance with this invention, FIG. 2 is a top view in section of a food dispenser embodiment of the invention, FIG. 3 is a side elevation view of a portable food dispenser container as afforded by the invention, FIG. 4 is a segmented view in elevation of the front of the dispenser shown in FIG. 3, and FIG. 5 is a top view of FIG. 4.

As shown in FIGS. 1 and 2 a pressurized container 10 having a wall 9 which may be metal or plastic is provided having a plurality of compartments 11 through 16 for sorting and dispensing foodstuffs. Thus hot coffee may be stored in compartment 14, soup in compartment 15 and warm mashed potatoes in compartment 16 for example. The entire outer surface of the container has an insulating layer 17 and if desirable to serve both hot and cold foodstuffs a divider wall 18 extending down the entire depth of the container is provided with an insulating surface 19.

The container is sealed to withstand internal pressurization such as by use of gasket 20 and clamp screws 21 in the manner of known pressure cooking pans and thus may also be provided with a safety pressure valve 22. A quick disconnect arrangement may also be used without clamping screws if desired.

Internal pressure may be individually provided to each compartment 14, 16, etc. in FIG. 1 by means of a pressure inlet valve 24 which may be connected to a source of steam or inert sterile gas under pressure, such as a capsule or hose with a quick disconnect valve assembly. Other means of applying pressure can be used without departing from the invention such as a pump or internal steam heater to produce pressure from a water supply or internal dry ice supply, etc. Generally it is better to prevent mixing atmospheres above foodstuffs to avoid contamination and thus it is desirable to separately charge each compartment to the desired pressure to discharge foodstuffs out of dispensing valve means 30 or 31. However if a common atmosphere is tolerable the upper end of divider 26 may be apertured to equalize pressures from a single pressure source.

The inner compartment 25 has walls 26 in common thermal contact with the foodstuff compartments 14, 15 and 16 to control the temperature therein simply and efficiently with a single temperature control source such as the replaceable heater element 23. Plug 29 may be replaced with a portable source of heat chemically generated or with cooling coils or a tank of dry ice, etc. to attain the desired temperature control. Hot and cold foodstuffs may be stored on opposite sides of wall 18 having insulating barrier 19 on both surfaces so that foodstuffs in chambers 11, 12 and 13 could be refrigerated while those in chambers 14, 15 and 16 are heated. In this manner such foodstuffs as frozen custard, milk or cooled beverages may be dispensed from the same container as hot soup, warm mashed potatoes, etc.

When sterile inert gas under pressure is added to a single foodstuff compartment it tends to retard spoilage and cause foodstuffs to be preserved and sanitized more readily. These containers are made in such a way that they are easily cleaned and sanitized of residual foodstuffs for reuse with various sanitary edges 28 etc. rounded to avoid trapping foodstuff, and with replaceable food dispensing valves 31 that can be thrown away, etc.

When both hot and cold foodstuffs are dispensed from the same container as shown in FIG. 2, the dividing wall 18 extends to the top lid 40, and has a pressure seal to permit separate pressurization of the hot and cold compartments.

In order to provide for simple sanitation required when the dispenser is to be reused, the top lid member 40 is removable to give access to the internal compartments 11—16, etc. Also the container is provided with replaceable outlets 41 which may be screwed in for example, and to which a hose 42 or valve 31 may be attached. Valve 31 may be for example an inexpensive disposable valve that need not be cleaned of the sort currently used in pressurized cans for dispensing cheese or whip cream, and thus could be replaced after every use. Outlet 41 may contain a quick release valve-connector if desired for attaching dispensing hose 42 to anyone of the ports 33, etc. However, generally it is not customary to mix the residual coffee with soup, etc., and preferably each port has its individual valve assembly 31 for dispensing individual valve assembly 31 for dispensing individual servings of foodstuffs at the proper temperature range at any time.

It is evident that this hereinbefore described structure serves the place of a kitchen in dispensing a variety of foods on site within a proper temperature range over extended periods of time. The apparatus gives the advantage of flexibility, not being confined to a single food or beverage or a fixed combination, and yet is inexpensive, reusable and efficient. It provides flexibility in temperature ranges and heating or pressurization approaches, but may incorporate such temperature engineering features as radiating fins, insulation layers, etc. to provide different temperatures in different compartments for say soup and mashed potatoes, if desired.

Whenever the dispensing container is to be carried by a person it may be constructed as shown in FIGS. 3 and 4 in which similar reference characters are used in FIGS. 1 and 2 for simple comparison of the various features. Primed reference characters refer to corresponding parts modified somewhat in structure.

In this embodiment a shoulder brace 50 is provided together with pad sections 51 and 52 to permit wearing on the back of a server. The hose 42 is retained in a storage nondispensing position alongside the container 10 in clamps 53, 54. It is evident that other shapes and configurations may be developed having particular advantage.

The compartment may have a single inner tank with a quick disconnect plug connector 58 at the top for applying steam or inert sterile gas pressure internally to force the foodstuff out the outlet plug 59 at the bottom.

To expedite dispensing of nonliquid bulk goods such as mashed potatoes in entirety and uniformly, a free floating piston 61 and gasket 62 may be used in the compartment as shown in FIG. 1. The gasket 62 is plastic, rubber or leather and serves to engage the compartment walls and ride on the surface of the goods to both seal the piston for movement by gas under pressure against the potatoes, etc. and to cause the piston 61, in the form of a cup, to float upright and level on the mass of bulk goods being forced out of outlet 31.

What I claim is:

1. A foodstuff dispensing device for dispensing nonliquid foodstuffs in entirety and uniformly, comprising in combination an insulated container for retaining foodstuffs in a predetermined temperature range, a plurality of compartments within the container for holding respectively stores of different materials, means for keeping the temperature within said compartment within said range, and means for dispensing from said stores foodstuffs in individual servings, including a free floating piston within one of said compartments on the surface of said materials with means to engage the compartment walls for containing gas under pressure.

2. A device as defined in claim 1, including compartment dividing means comprising a special compartment having walls in thermal contact with a plurality of surrounding foodstuff storage compartments, and said special compartments comprising part of said means for keeping the temperature within said range.

3. A container as defined in claim 1, wherein said container has separature internal compartments for hot and cold products which are insulated from each other.

4. A foodstuff dispensing device comprising in combination, an insulated container for retaining foodstuffs in a predetermined temperature range, a plurality of compartments within the container for holding respectively stores of different materials, means for keeping the temperature within said compartment within said range, and means for dispensing from said stores foodstuff in individual servings including gaseous atmosphere under pressure in said compartment and a movable piston disposed between said gaseous atmosphere and store of foodstuff to ride on the surface of the foodstuff and force foodstuff out of said containers.

5. A device as defined in claim 4, wherein the container comprises a shell having internal compartment dividing means providing at least two compartments constructed to store and dispense foodstuffs.

6. A device as defined in claim 2, including an electric heater element disposed in said means for keeping the temperature within said range.

7. A device as defined in claim 4, wherein said container is constructed to receive a charge of liquid and means for heating said liquid to produce steam under pressure within said container.

8. A device as defined in claim 2, including a valve that permits discharge of foodstuffs.

9. A device as defined in claim 2, wherein the discharge means includes an apertured outlet with a fitting for coupling an external discharge valve element.

10. A foodstuff dispensing device as defined in claim 4, including communicating channels disposed between said compartments to produce a common atmosphere in said compartments by common pressurization means.

11. A foodstuff dispensing device comprising in combination a portable container retaining foodstuffs such as mashed potatoes, for dispensing at different locations comprising at least one compartment with an access opening for loading the compartment, and an outlet dispensing opening for removing the foodstuffs, means sealing the compartment for receiving gas therein at an elevated pressure, and a free floating piston member inserted in said compartment to ride upon the foodstuff and contain said gas in a region of the compartment separate from the foodstuff, said piston serving to force the foodstuff out of said outlet by sole force of said gas acting on said piston member.